United States Patent
Alramadhan

(10) Patent No.: US 12,140,249 B2
(45) Date of Patent: Nov. 12, 2024

(54) UTILIZING ELASTIC SENSING ELEMENTS AS A MONITORING TECHNIQUE FOR EARLY FAULT DETECTION OF CONTROL VALVE DIAPHRAGM FAILURE

(71) Applicant: SAUDI ARABIAN OIL COMPANY, Dhahran (SA)

(72) Inventor: Ibrahim Samir Alramadhan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 111 days.

(21) Appl. No.: 18/147,523

(22) Filed: Dec. 28, 2022

(65) Prior Publication Data

US 2024/0218940 A1   Jul. 4, 2024

(51) Int. Cl.
| | |
|---|---|
| F16K 37/00 | (2006.01) |
| E21B 34/02 | (2006.01) |
| F16K 41/12 | (2006.01) |
| G08B 21/18 | (2006.01) |

(52) U.S. Cl.
CPC .......... *F16K 37/0083* (2013.01); *F16K 41/12* (2013.01); *G08B 21/182* (2013.01); *E21B 34/025* (2020.05); *Y10T 137/0486* (2015.04)

(58) Field of Classification Search
CPC . Y10T 137/486; F16K 37/0083; F16K 41/12; G08B 21/182; E21B 34/025
See application file for complete search history.

(56) References Cited

U.S. PATENT DOCUMENTS

| | | | |
|---|---|---|---|
| 10,030,789 B2 * | 7/2018 | Shinohara | G01N 27/20 |
| 10,325,472 B1 * | 6/2019 | Harsdorff | A41B 11/00 |
| 10,550,959 B2 | 2/2020 | Carder et al. | |
| 2008/0202606 A1 * | 8/2008 | O'Hara | F16K 7/123 |
| | | | 137/551 |
| 2016/0123497 A1 * | 5/2016 | Shinohara | F16K 37/0083 |
| | | | 137/551 |
| 2020/0105125 A1 * | 4/2020 | Haas | G01D 3/08 |
| 2021/0372270 A1 * | 12/2021 | Gooneratne | E21B 47/08 |
| 2022/0034424 A1 * | 2/2022 | Hartmann | F16K 37/0041 |
| 2022/0107034 A1 * | 4/2022 | Genta | F16K 5/0689 |
| 2022/0356961 A1 * | 11/2022 | Al Faihan | F16K 37/0083 |

FOREIGN PATENT DOCUMENTS

KR   20220162027 A  * 12/2022  ......... F16K 37/0041

* cited by examiner

*Primary Examiner* — Craig M Schneider
*Assistant Examiner* — Frederick D Soski
(74) *Attorney, Agent, or Firm* — Osha Bergman Watanabe & Burton LLP

(57) ABSTRACT

A method for early detection of control valve diaphragm failure is disclosed. The method includes disposing an elastic sensing element on a diaphragm of a pneumatic control valve, generating, using the elastic sensing element, a baseline sensor record comprising initial elasticity measurements of the diaphragm, generating, using the elastic sensing element and during a useful life of the control valve, a sequence of periodic sensor records comprising periodic elasticity measurements of the diaphragm, generating, in response to any periodic sensor record differs from the baseline sensor record by a pre-determined threshold, an alarm, and performing, in response to the alarm, a maintenance operation of the control valve.

20 Claims, 8 Drawing Sheets

UTILIZING ELASTIC SENSING ELEMENTS AS A MONITORING TECHNIQUE FOR EARLY FAULT DETECTION OF CONTROL VALVE DIAPHRAGM FAILURE

BACKGROUND

A control valve regulates the rate of fluid flow as the position of the valve plug or disk is changed by force from an actuator. The main aim of a control valve is to keep a process variable (e.g., pressure, flow, level, temperature, etc.) within a required operating range to ensure an end product quality. The valve is opened and closed by a force generated via the valve's actuator. The actuator may be operated based on electricity such as in a motor-operated valve, based on pressurized oil hydraulics such as in a hydraulic valve, or based on pneumatic air pressure utilizing a diaphragm such as a pneumatic valve. The pneumatic valve is commonly used in oil and gas application such as a production well, a transportation pipeline network, and a processing plant. It is common practice in the oil and gas industry to inspect the control valve diaphragm during a planned turnaround and inspection (T&I) event or to consider the control valve diaphragm as a run-to-fail component. From time to time, the control valve diaphragm may fail before the T&I event. The diaphragm failure results in costly impact to the oil gas production operation.

SUMMARY

In general, in one aspect, the invention relates to a method for early detection of control valve diaphragm failure. The method includes disposing an elastic sensing element on a diaphragm of a pneumatic control valve, generating, using the elastic sensing element, a baseline sensor record comprising initial elasticity measurements of the diaphragm, generating, using the elastic sensing element and during a useful life of the control valve, a sequence of periodic sensor records comprising periodic elasticity measurements of the diaphragm, generating, in response to any periodic sensor record differs from the baseline sensor record by a pre-determined threshold, an alarm, and performing, in response to the alarm, a maintenance operation of the control valve.

In general, in one aspect, the invention relates to a pneumatic control valve. The pneumatic control valve includes a diaphragm for controlling a fluid passage of the pneumatic control valve, and an elastic sensing element disposed on the diaphragm for early failure detection, wherein a baseline sensor record is generated using the elastic sensing element and comprises initial elasticity measurements of the diaphragm, wherein a sequence of periodic sensor records during a useful life of the control valve is generated using the elastic sensing element and comprises periodic elasticity measurements of the diaphragm, wherein an alarm is generated in response to any periodic sensor record differs from the baseline sensor record by a pre-determined threshold, and wherein a maintenance operation of the control valve is performed in response to the alarm.

In general, in one aspect, the invention relates to a system for early detection of control valve diaphragm failure. The system includes a pneumatic control valve comprising a diaphragm for controlling a fluid passage of the pneumatic control valve, and an elastic sensing element disposed on the diaphragm for early failure detection, and a data gathering and analysis system configured to generate, using the elastic sensing element, a baseline sensor record comprising initial elasticity measurements of the diaphragm, generate, using the elastic sensing element and during a useful life of the control valve, a sequence of periodic sensor records comprising periodic elasticity measurements of the diaphragm, generate, in response to any periodic sensor record differs from the baseline sensor record by a pre-determined threshold, an alarm, and facilitate, in response to the alarm, a maintenance operation of the control valve.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
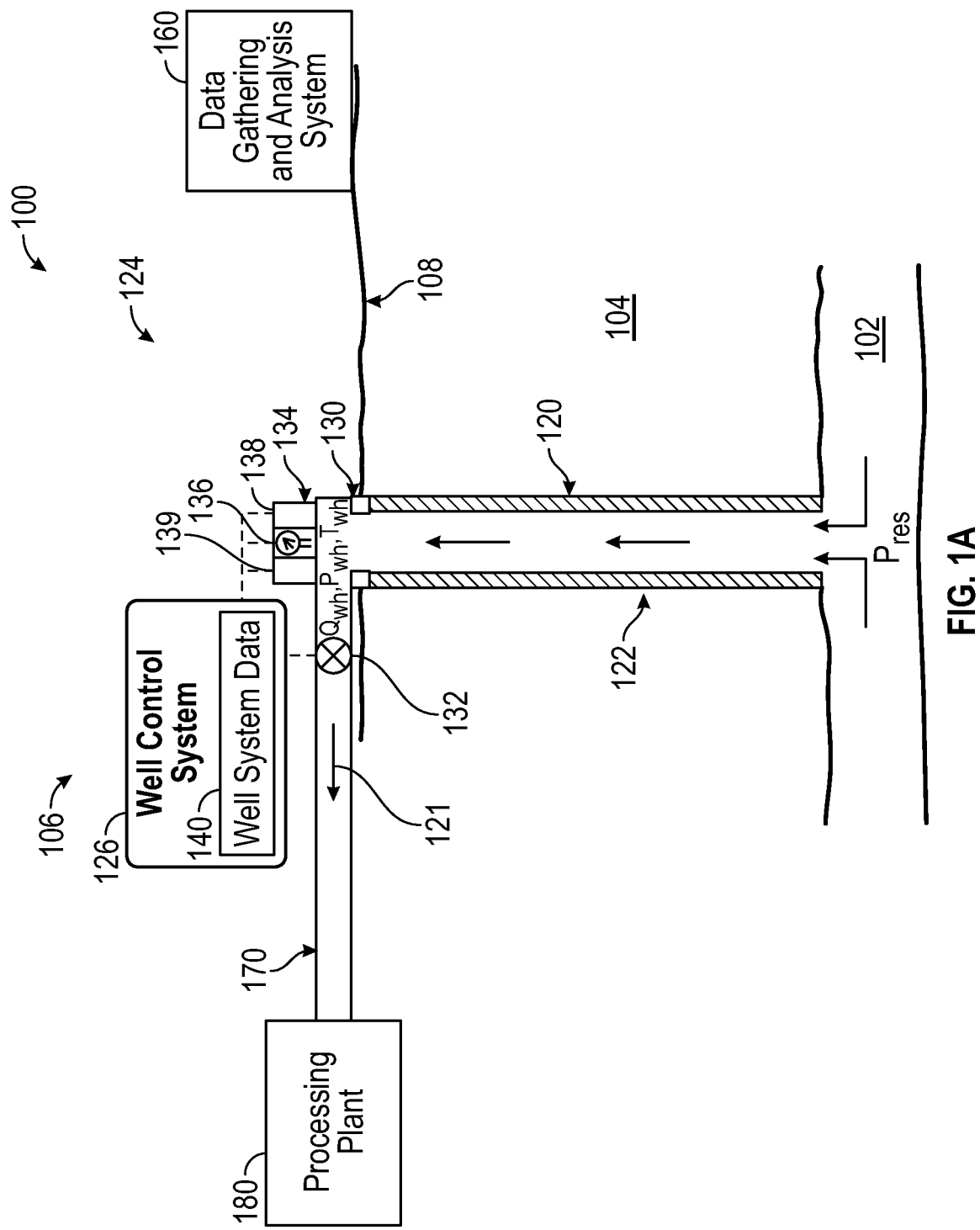
FIGS. 1A-1C show a system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method, a system, and a non-transitory computer readable medium for early fault detection of control valve diaphragm failure. In one or more embodiments of the invention, a pneumatic control valve is installed in a production system where the control valve includes a diaphragm for controlling a fluid passage and an elastic sensing element disposed on the diaphragm for early failure detection. In one or more embodiments of the invention, a data gathering and analysis system is provided that uses the elastic sensing element to generate sensor records including initial elasticity measurements of the diaphragm and periodic elasticity measurements of the diaphragm. In response to any periodic sensor record differs from the baseline sensor record by a predetermined threshold, an alarm is generated to initiate or otherwise facilitate a maintenance operation of the control valve.

Turning to FIG. 1A, FIG. 1A shows a schematic diagram in accordance with one or more embodiments. As shown in FIG. 1A, FIG. 1A illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102). The well system (106) may be part of a production system that further includes a pipeline network (170) and a processing plant (180) for transporting and processing the hydrocarbons, i.e., production from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computing system (400) described below in FIG. 4 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records well system data (140) for the well system (106). The well system data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. The well system data (140) may further include monitoring data of well components (e.g., production valve (132)). In some embodiments, the measurements are recorded in real-time, and are available for review or use within seconds, minutes or hours of the condition being sensed (e.g., the measurements are available within 1 hour of the condition being sensed). In such an embodiment, the well system data (140) may be referred to as "real-time" well system data (140). Real-time well system data (140) may enable an operator of the well (106) to assess a relatively current state of the well system (106), and make real-time decisions regarding development and maintenance of the well system (106) and the reservoir (102), such as on-demand adjustments in regulation of production flow from the well or preventive maintenance to prevent disruption to the production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (120) to define a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the hydrocarbon-bearing formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) (e.g., pneumatic valves) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead.

As such, the choke assembly may include set of high pressure valves (e.g., pneumatic valves) and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain well system data (140) (e.g., pneumatic valve monitoring data) regarding the choke assembly as well as transmit one or more commands to components within the choke assembly in order to adjust one or more choke assembly parameters.

Keeping with FIG. 1A, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a data gathering and analysis system (160). For example, the data gathering and analysis system (160) may include hardware and/or software with functionality for facilitating operations of the well system (106), such as well production operations, well drilling operation, well completion operations, well maintenance operations, and reservoir monitoring, assessment and development operations. For example, the data gathering and analysis system (160) may store well system data (140). In some embodiments, the data gathering and analysis system (160) may analyze pneumatic valve monitoring data to generate recommendations to facilitate various operations of the well system (106), such as a preventive maintenance of pneumatic valves in the well system (106). While the pneumatic valve monitoring data is described above for control valves installed in the well system (106), additional and/or alternative pneumatic valve monitoring data may correspond to control valves installed in the pipeline network (170) and/or the processing plant (180). While the data gathering and analysis system (160) is shown at a well site, embodiments are contemplated where reservoir and/or basin simulators are located away from well sites. In some embodiments, the data gathering and analysis system (160) may include a computer system that is similar to the computing system (400) described below with regard to FIG. 4 and the accompanying description.

Figure 1B:
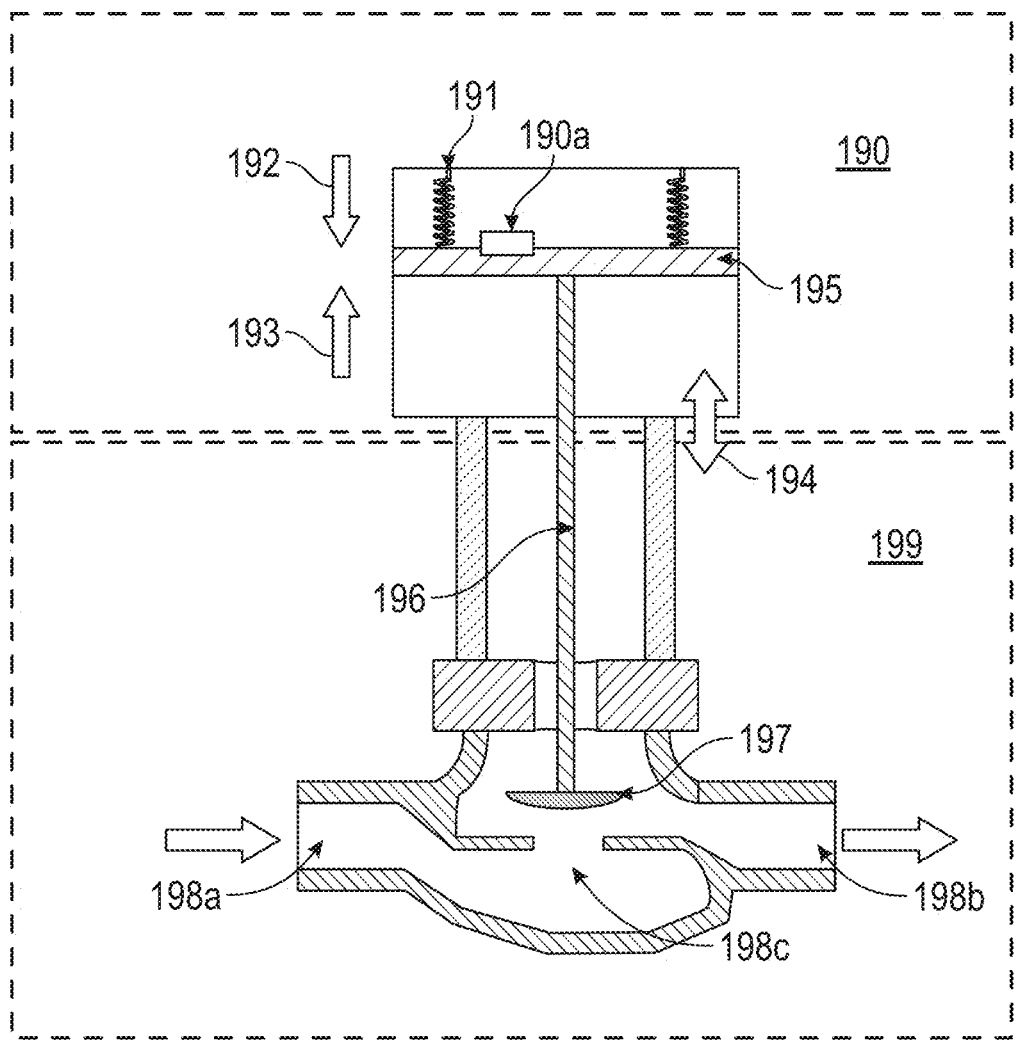

Turning to FIG. 1B. FIG. 1B shows a schematic diagram in accordance with one or more embodiments. In one or more embodiments, one or more of the modules and/or elements shown in FIG. 1B may be omitted, repeated, and/or substituted. Accordingly, embodiments of the invention should not be considered limited to the specific arrangements of modules and/or elements shown in FIG. 1B.

As shown in FIG. 1B, FIG. 1B illustrates a cross sectional view of a pneumatic valve, such as the production valves, high pressure valves, and other valves deployed throughout the well system (106), pipeline network (170), and processing plant (180) depicted in FIG. 1A above. For example, the pneumatic valve shown in FIG. 1B may correspond to the production valve (132) depicted in FIG. 1A above. The pneumatic valve includes an actuator (190) and a body (199). The actuator (190) controls a position and shape of a flexible diaphragm (195) by way of an elastic force (192) of springs (191) and an air pressure (193) of air injected/released via a control port (194). The diagram (195) is coupled to a plug (197) via a valve stem (196). The range of movement of the plug (197) throughout a complete cycle of air injection and release via the control port (194) is referred to as a stroking travel. The body (199) provides a mechanical structure to connect the actuator (190) to a fluid passage having an input port (198a) and an output port (198b). The position and shape of the flexible diaphragm (195) in turn determines the relative position of the plug (197) with respect to an opening (198c) that controls the fluid passage between the input port (198a) and the output port (198b). Accordingly, the relative position of the plug (197) with respect to the opening (198c) during the stroking travel determines whether the pneumatic valve, more specifically the fluid passage is open, closed, or partially open. In one or more embodiments, a sensor (190a) is embedded in, or otherwise attached to the flexible diaphragm (195). The output of the sensor (190a) is monitored to determine whether the flexible diaphragm (195) is functioning properly or needs to be replaced for the pneumatic valve. For example, the sensor (190a) may be a stress-sensitive electrical resistance gauge where the sensor output represents a magnitude of stress or deformation experienced by the flexible diaphragm (195). In another example, the sensor (190a) may be a strain gauge that measures strain on the diaphragm (195). A strain gauge consists of an insulating flexible backing which supports a metallic foil pattern. As the diaphragm (195) is deformed, the foil is deformed, causing its electrical resistance to change. This resistance change is related to the strain by the quantity known as the gauge factor. The monitoring history of the sensor output over time may indicate whether the flexible diaphragm (195) is functioning properly or needs to be replaced.

Figure 1C:
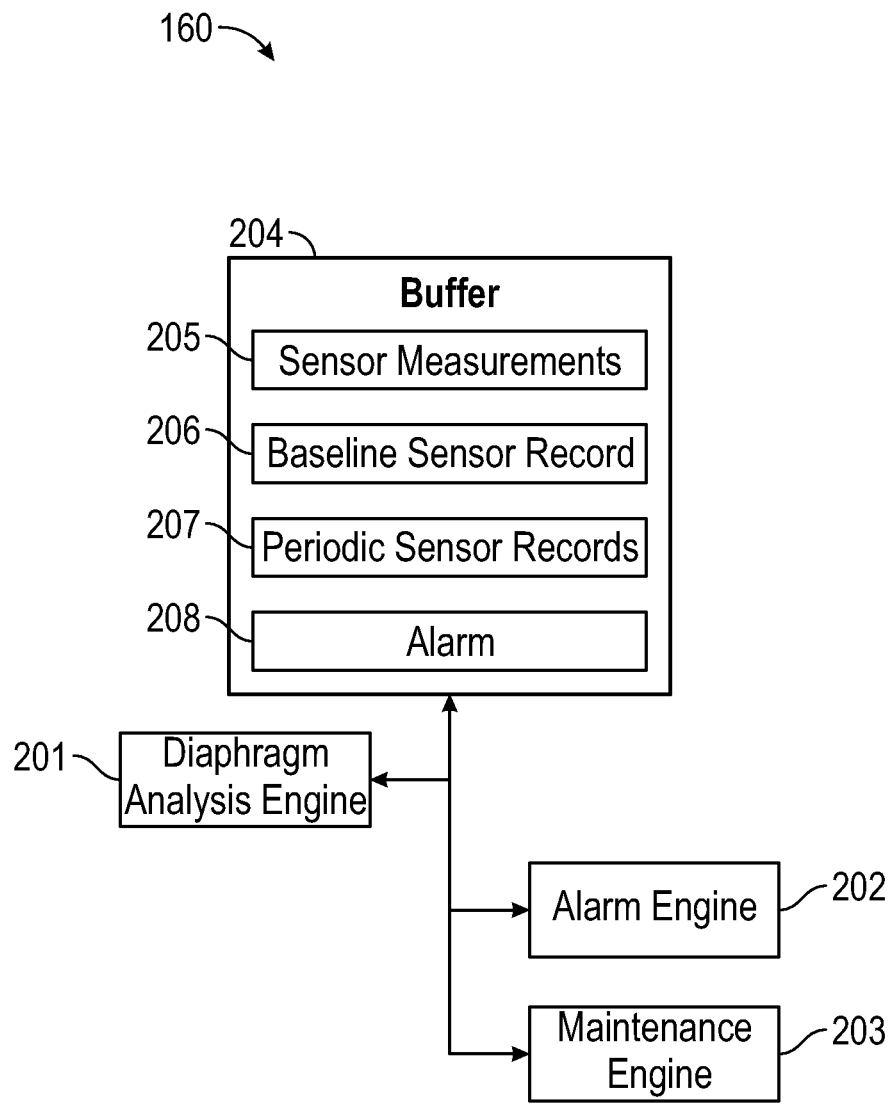

Turning to FIG. 1C, FIG. 1C shows a schematic diagram in accordance with one or more embodiments. In one or more embodiments, one or more of the modules and/or elements shown in FIG. 1C may be omitted, repeated, and/or substituted. Accordingly, embodiments of the invention should not be considered limited to the specific arrangements of modules and/or elements shown in FIG. 1C.

As shown in FIG. 1C, FIG. 1C illustrates the data gathering and analysis system (160) that has multiple components, including, for example, a buffer (204), a diaphragm analysis engine (201), an alarm engine (202), and a maintenance engine (203). Each of these components (201, 202, 203, 204) may be located on the same computing device (e.g., personal computer (PC), laptop, tablet PC, smart phone, multifunction printer, kiosk, server, etc.) or on different computing devices that are connected via a network, such as a wide area network or a portion of Internet of any size having wired and/or wireless segments. Each of these components is discussed below.

In one or more embodiments disclosed herein, the buffer (204) may be implemented in hardware (i.e., circuitry), software, or any combination thereof. The buffer (204) is configured to store data generated and/or used by the data gathering and analysis system (160). The data stored in the buffer (204) includes the sensor measurements (205), the baseline sensor record (206), the periodic sensor records (207), and the alarm (208). The sensor measurements (206) are measurement data generated by the sensor (190a) to represent stress or strain experienced by the diaphragm (195). For example, the measurement data may include stress-sensitive resistance values. A sensor record is a collection of recorded measurement data of the sensor measurements (206) generated throughout one or more complete stroking travel of the diaphragm (195). The baseline sensor record (206) is the sensor record that is generated and recorded within a short time period after a new control valve is installed in the production system or after a used diaphragm is replaced by a new diaphragm in a refurbished control valve in the production system. The baseline sensor record (206) represents a measure of elasticity of the diaphragm (195) at the beginning of the useful life of the diaphragm (195). For example, the range (i.e., difference between the maximum and minimum values) of the measurement data within a complete stroking travel in the baseline sensor record (206) is proportional to the elasticity of the diaphragm (195) when it is new. In other words, the more elastic the diaphragm (195) is, the larger the range of the measured stress-sensitive resistance values in a complete stroking travel, and vice versa.

The periodic sensor records (207) are a sequence of sensor records that are generated and recorded periodically (e.g., once a day, a month, a quarter, a year, other predetermined time periods) after a new control valve is installed in the production system or after a used diaphragm is replaced by a new diaphragm in a refurbished control valve in the production system. The periodic sensor records (207) represent a measure of elasticity degradation of the diaphragm (195) throughout the useful life of the diaphragm (195). For example, the range (i.e., difference between the maximum and minimum values) of the measurement data within a complete stroking travel in one of the periodic sensor records (207) is proportional to the elasticity of the diaphragm (195) at a corresponding time of measurement or a particular point in the useful life of the diaphragm (195). The alarm (208) is a message to indicate that the diaphragm (195) is near the end of useful life. For example, the alarm (208) may be a displayable message or an audible message to alert a human user who may initiate a maintenance operation to replace or refurbish the control valve with the diaphragm nearing the end of useful life. In another example, the alarm (208) may be an electronic signal sent to an automated maintenance system for procuring and delivering a new control valve or a new diaphragm to the production system site for performing a maintenance operation to replace or refurbish the control valve with the diaphragm nearing the end of useful life.

In one or more embodiments of the invention, the diaphragm analysis engine (201) may be implemented in hardware (i.e., circuitry), software, or any combination thereof.

The diaphragm analysis engine (201) is configured to obtain and store the sensor measurements (205) and to generate the baseline sensor record (206) and the periodic sensor records (207). In addition, the diaphragm analysis engine (201) is configured to generate the alarm (208) in response to any periodic sensor record differs from the baseline sensor record by a pre-determined threshold.

In one or more embodiments of the invention, the alarm engine (202) may be implemented in hardware (i.e., circuitry), software, or any combination thereof. The alarm engine (202) is configured to deliver the alarm (208) and to trigger a maintenance operation of the control valve with the diaphragm (195). For example, the alarm engine (202) may deliver the alarm (208) as a visual and/or audible message to a human user who in turn initiates and/or performs the maintenance operation. In another example, the alarm engine (202) may send the alarm (208) as an electronic signal to an automated maintenance system for procuring and delivering a new control valve or a new diaphragm to the production system site for performing the maintenance operation.

In one or more embodiments of the invention, the maintenance engine (203) may be implemented in hardware (i.e., circuitry), software, or any combination thereof. The maintenance engine (203) is configured to facilitate, in response to the alarm (208), the maintenance operation of the control valve. For example, the maintenance engine (203) may log maintenance histories for a collection of control valves in the production system and generate an estimated maintenance schedule based on the logged maintenance histories. In another example, the maintenance engine (203) may receive the alarm (208) as the electronic signal from the alarm engine (202) to initiate procurement and delivery of new control valves and/or replacement diaphragms to the production system site for performing the maintenance operation.

In one or more embodiments of the invention, the diaphragm analysis engine (201), alarm engine (202), and maintenance engine (203) collectively perform the aforementioned functions using the method described in reference to FIG. 2 below.

Figure 2:
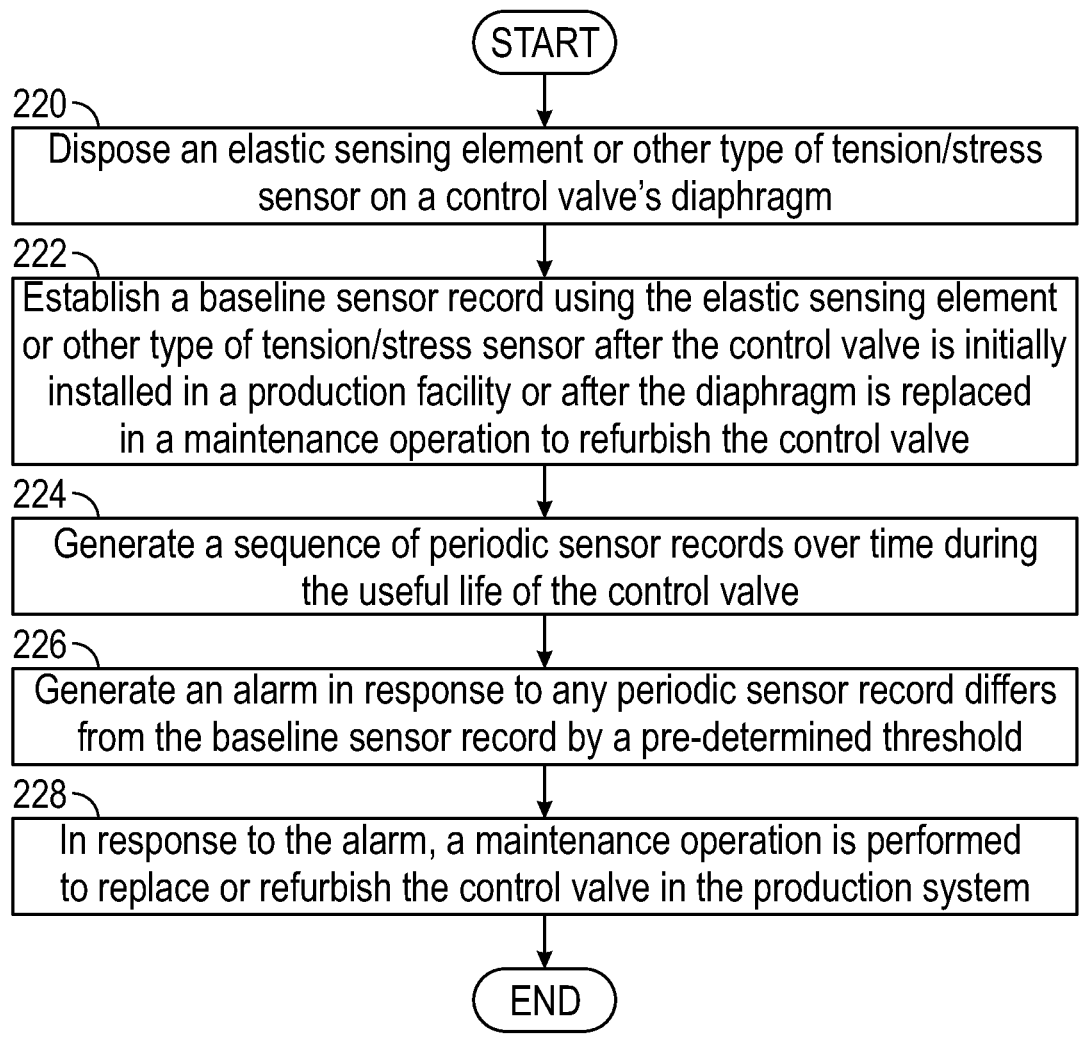
FIG. 2 shows a flowchart in accordance with one or more embodiments.

Turning to FIG. 2, FIG. 2 shows a flowchart in accordance with one or more embodiments. Specifically, FIG. 2 describes a method for early fault detection of control valve diaphragm failure. One or more blocks in FIG. 2 may be performed using one or more components as described in FIGS. 1A-1C. While the various blocks in FIG. 1A are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 220, an elastic sensing element or other type of tension/stress sensor is disposed on the control valve's diaphragm. The sensor changes output as the deformation of the diaphragm changes. The sensor output may be transmitted using electrical wires or transmitted wirelessly. In one or more embodiments, the sensor is attached to the diaphragm using one or more of a bonding agent, a soldering agent, or a mechanical bolt. In one or more embodiments, the sensor is embedded within the diaphragm during manufacturing process of the diaphragm. As described below, the elastic sensing element or other type of tension/stress sensor enables a user to continuously monitor the control valve diaphragm condition to improve maintenance and prevent costly production disruption due to a complete control valve failure.

In Block 222, the diaphragm's elasticity is monitored using the elastic sensing element or other type of tension/stress sensor to establish a baseline sensor record. In a sensor record, the sensor output is measured and recorded throughout one or more full valve stroking travel. In other words, the sensor output is recorded versus the percentage of valve opening from 0% open (i.e., fully closed) to 100% open (i.e., fully open) to generate the sensor record. In one or more embodiments, the sensor record represents a measure of elasticity of the diaphragm.

After the control valve is initially installed in the production facility or after the diaphragm is replaced in a maintenance operation to refurbish the control valve, the sensor record is recorded as the baseline sensor record. For example, the baseline sensor record may correspond to an initial diaphragm deformation range as the new or newly refurbished valve is fully opened from being fully closed. In one or more embodiments, the baseline sensor record represents an initial measure of elasticity of the new diaphragm.

In Block 224, the diaphragm's elasticity is monitored using the elastic sensing element or other type of tension/stress sensor periodically during the useful life of the control valve to generate a sequence of periodic sensor records over time. For example, the sensor output is measured and recorded throughout one or more full valve stroking travel as a periodic sensor record every month, quarter, or year. In one or more embodiments, the periodic sensor record represents a period measure of elasticity of the used diaphragm over time.

In Block 226, an alarm is generated in response to any periodic sensor record differs from the baseline sensor record by a pre-determined threshold. For example, the alarm may be generated when the periodic measure of elasticity of the used diaphragm is reduced from the initial measure of elasticity of the new diaphragm by 20%. The alarm may be presented to the user in a control room or via an asset management system of the production system.

In Block 228, in response to the alarm, a maintenance operation is performed to replace or refurbish the control valve in the production system.

In one or more embodiments, Blocks 222-228 are performed by the diaphragm analysis engine (201), alarm engine (202), and maintenance engine (203) described in reference to FIG. 1C above. For example, recording sensor outputs to generate the baseline sensor record and periodic sensor records, generating the alarm, and performing the maintenance operation may be performed or otherwise facilitated using the data gathering and analysis system (160) implemented based on the computing system (400) described in reference to FIG. 4 below.

Turning to FIGS. 3A-3D, FIGS. 3A-3D provides an example of early fault detection of control valve diaphragm failure. The example shown in FIGS. 3A-3D may be, for example, based on one or more components depicted in FIGS. 1A-1C above and the method flowchart depicted in FIG. 2 above. In one or more embodiments, one or more of the modules and/or elements shown in FIGS. 3A-3D may be omitted, repeated, and/or substituted. Accordingly, embodiments of the invention should not be considered limited to the specific arrangements of modules and/or elements shown in FIGS. 3A-3D.

Figure 3A:
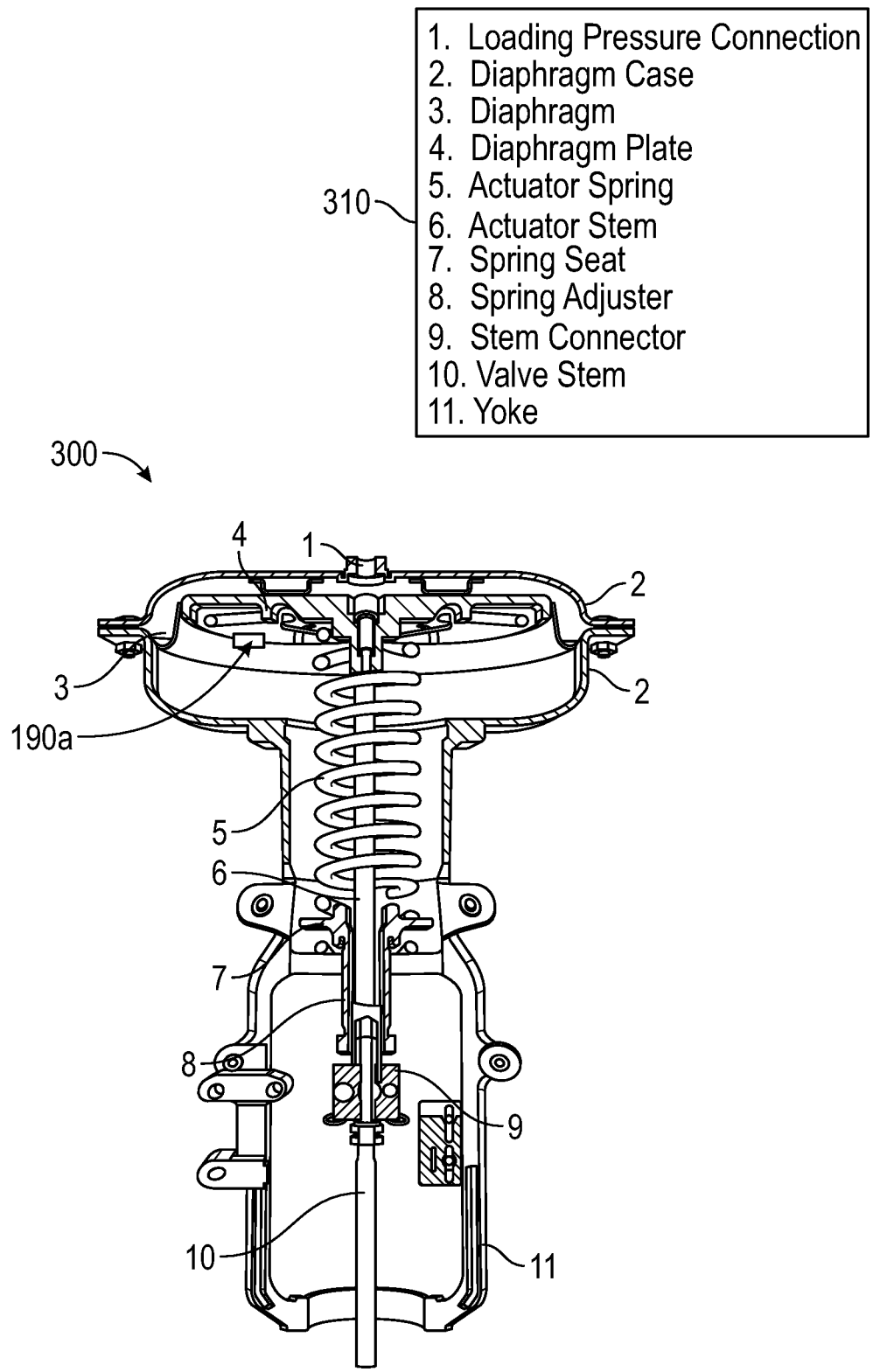
FIGS. 3A-3E show an example in accordance with one or more embodiments.

FIG. 3A shows an example actuator (300) of the pneumatic control valve depicted in FIG. 1B above. As shown in FIG. 3A, the actuator (300) includes a loading pressure connection (1), a diaphragm case (2), a diaphragm (3), a diaphragm plate (4), an actuator spring (5), an actuator stem (6), a spring seat (7), a spring adjuster (8), a stem connector (9), a valve stem (9), and a yoke (11). In particular, the loading pressure connection (1), diaphragm (3), actuator spring (5), and valve stem (9) correspond to the control port (194), diaphragm (195), spring (191), and valve stem (196) depicted in FIG. 1B above.

The basic operation of pneumatic control valve is described as (a)-(d) below.

(a) Pneumatic air pressure is injected into the actuator via the loading pressure connection (1). The air pressure moves the valve to the close position (or open position depend on the valve design) in order to control the rate of fluid flow. For example, a 4-20 mA electrical control signal swing is converted by a pneumatic transducer to 3-15 PSI pneumatic air pressure difference at the loading pressure connection (1).

(b) The air pressure presses and causes the diaphragm (3) to deform and in turn press into the actuator spring (5).

(c) The actuator spring (5) is attached to the valve stem (10) via the actuator stem (6). Pressing the actuator spring (5) causes the valve stem (10) to move down and hence closes the closure membrane of the control valve (or opens it depends on the valve design). The closure membrane corresponds to the plug (197) of FIG. 1B but is not shown in FIG. 3A.

(d) Reducing the loading pneumatic air pressure reduces the deformation of the diaphragm (3) and returns the diaphragm (3) to it is original position thus opens the control valve (or closes it depends on the valve design).

Diaphragm (3) plays a vital role in the operation of any control valve. A typical diagram is a flexible, pressure responsive element that transmits force to the diaphragm plate (4) and actuator stem (6). The diaphragm (3) may fail due to continuous stress by the air pressure to develop cracks that leak air. The failed diaphragm (3) would eventually lead the control valve into the failsafe mode and interrupt normal operation of the production system where the control valve is installed. To provide early detection of control valve diaphragm failure, a sensor (190a) is installed operatively connected to the diaphragm (3) as described in reference to FIG. 3B below.

Figure 3B:
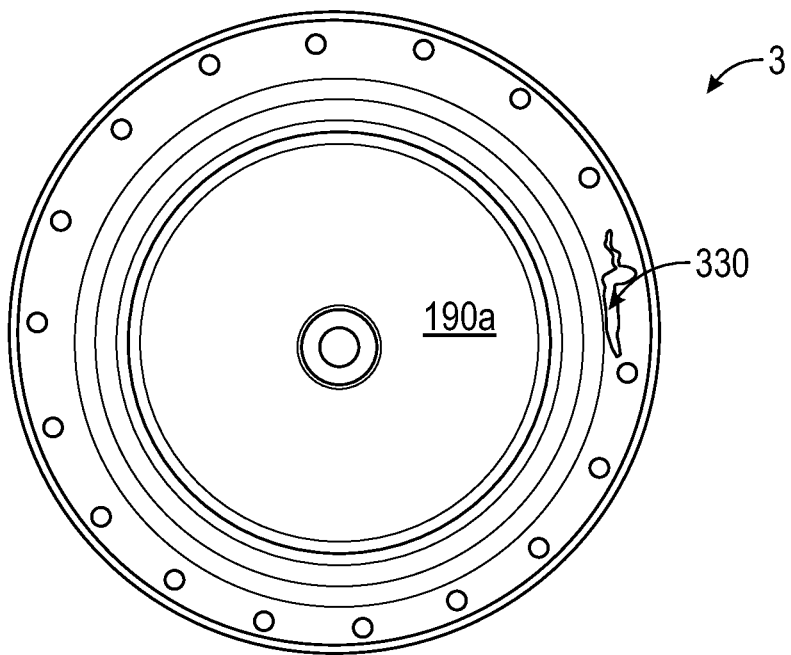

FIG. 3B shows an example of the diaphragm (3) that has experienced a stress failure and developed a crack (330). As shown in FIG. 3B, the diaphragm (3) is installed a sensor (190a) to provide a continuous and online monitoring of the diaphragm condition for fatigue, cracking, or change in the diaphragm elasticity. For example, the sensor (190a) may be any elasticity sensing element, such as a strain gauge. It is advantageous to detect these failure conditions at an early stage to alert the user that the control valve needs diaphragm replacement or refurbish service. Early fault detection of control valve diaphragm failure promotes more efficient maintenance and longer useful life of the control valve.

One method for determining the condition of the control valve diaphragm is to infer form the diagram elasticity. In other words, the diaphragm performance is inferred by measuring diaphragm elasticity and compare it with a baseline condition. The baseline condition is the elasticity of the diaphragm at the very beginning of it is operation life.

Figure 3C:
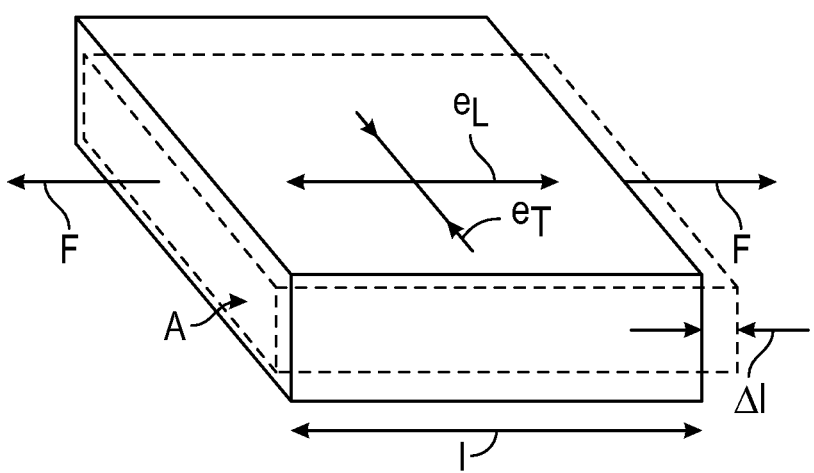
Figure 3D:
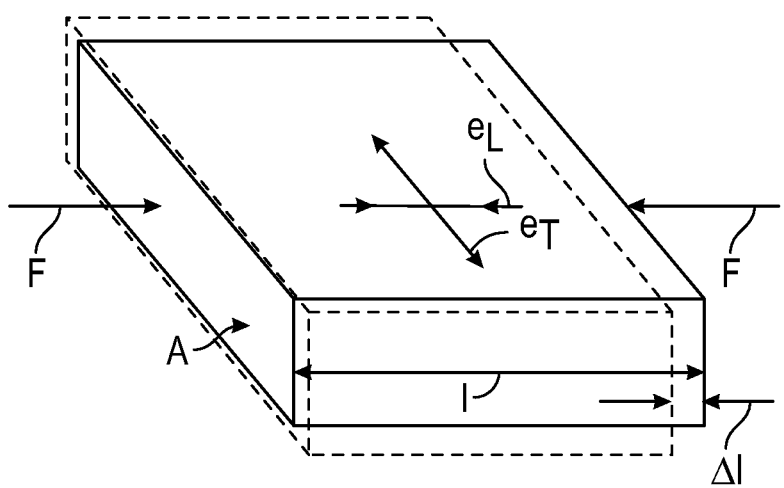

FIGS. 3C-3D shows an illustration of stress as defined by force/area. The effect of the applied stress is to produce a strain in a rectangular body which is defined by (change in length)/(original unstressed length). The rectangular body is a schematic representation of the diaphragm in a pneumatic control valve. As shown in FIG. 3C, the tensile strain experienced by the rectangular body is $e=+\Delta l/l$, and the stress experienced by the rectangular body is $+F/A$, the positive sign indicating a tensile stress which tends to increase the length l of the rectangular body. As shown in FIG. 3D, the compressive strain experienced by the rectangular body is $e=-\Delta l/l$ and the stress experienced by the rectangular body is $-F/A$, the negative sign indicating a compressive stress which tends to reduce the length l of the body.

In both cases depicted in FIGS. 3C-3D, the strain is longitudinal, i.e., along the direction of the applied stress. The relationship between strain and stress is linear for the rectangular body over a certain range of values and the slope of the straight line is referred to as the elastic modulus of the rectangular body, i.e., elastic modulus=stress/strain.

Figure 3E:
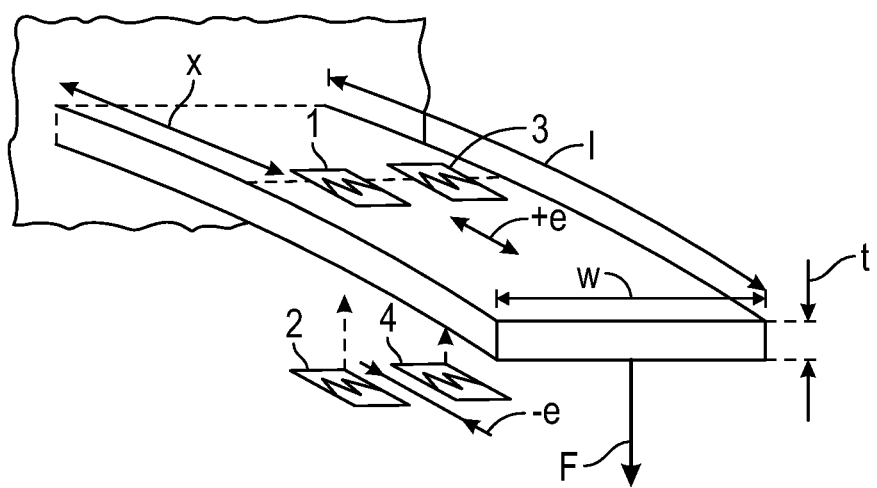

FIG. 3E shows an illustration of using strain gauges to measure strain in the rectangular body. A strain gauge is a metal or semiconductor element whose resistance changes when under strain. The relationship between changes in resistance and strain is referred to as the gauge factor, which depends on the factors that influence the resistance of the strain-sensitive element. As shown in FIG. 3E, the strain gauges (1) and (3) are attached on a top surface of the rectangular body. In addition, the strain gauges (2) and (4) are attached on a bottom surface of the rectangular body. The rectangular body is a schematic representation of the diaphragm in a pneumatic control valve, such as the diaphragm (195) or diaphragm (3) described above.

Figure 4:
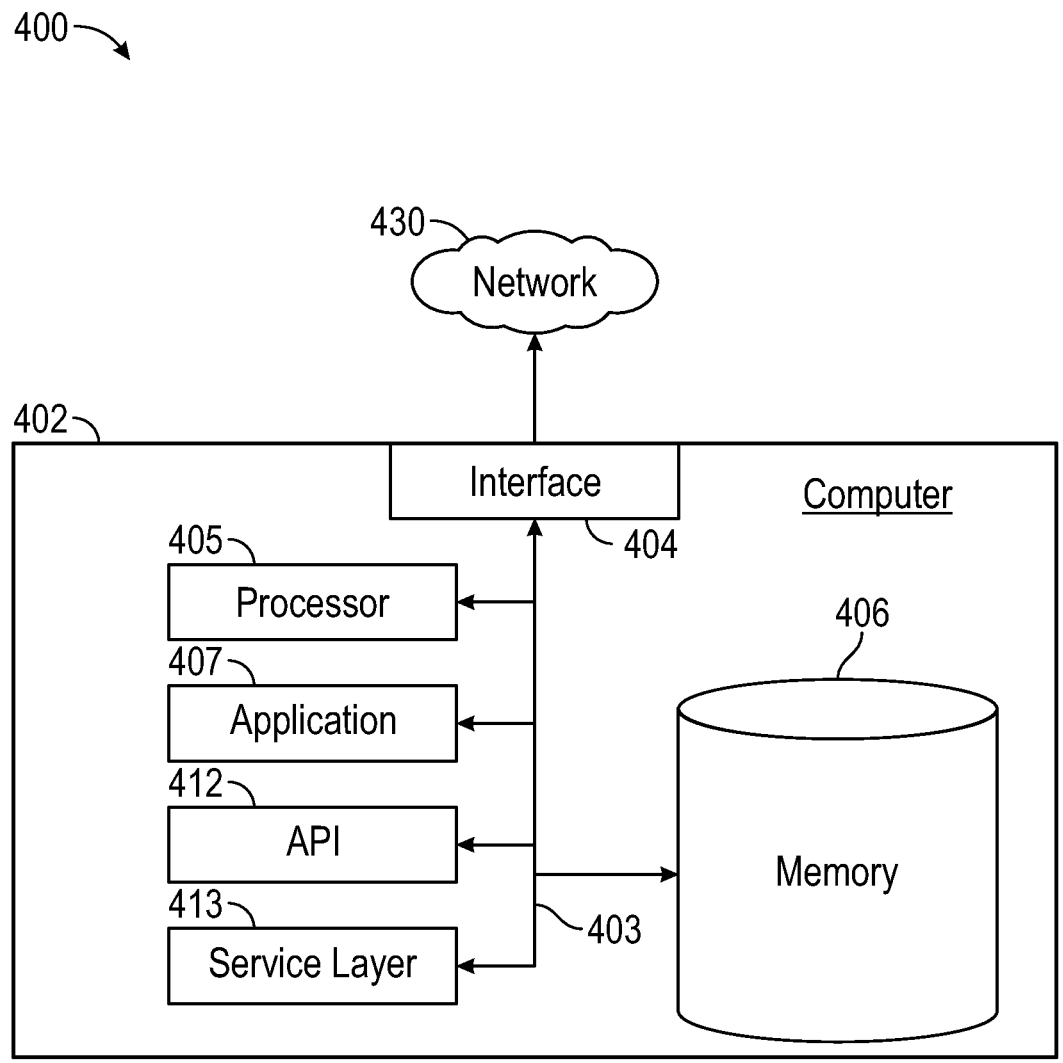
FIG. 4 shows a computing system in accordance with one or more embodiments.

Embodiments may be implemented on a computing device. FIG. 4 depicts a block diagram of a computing system (400) including a computer (402) used to provide computational functionalities associated with described machine learning networks, algorithms, methods, functions, processes, flows, and procedures as described in this disclosure, according to one or more embodiments. The illustrated computer (402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols, such as the Wellsite Information Transfer Specification (WITS) protocol, associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing a computer (402), wherein each computer (402) communicates over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

While the invention has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for early detection of control valve diaphragm failure, the method comprising:
    disposing an elastic sensing element on a diaphragm of a pneumatic control valve;
    generating, using the elastic sensing element, a baseline sensor record comprising initial elasticity measurements of the diaphragm, wherein the baseline sensor record is a collection of recorded measurement data of sensor measurements generated throughout one or more complete stroking travel of the diaphragm;
    generating, using the elastic sensing element and during a useful life of the control valve, a sequence of periodic sensor records comprising periodic elasticity measurements of the diaphragm;
    generating, in response to any periodic sensor record differs from the baseline sensor record by a pre-determined threshold, an alarm;
    performing, in response to the alarm, a maintenance operation of the control valve; and
    storing the sensor measurements, the baseline sensor record, the periodic sensor records, and the alarm into a buffer.

2. The method according to claim 1, wherein the baseline sensor record is generated within a pre-determined time period of initial installation of the control valve in a production system.

3. The method according to claim 1, wherein the baseline sensor record is generated within a pre-determined time period of replacing the diaphragm in the control valve that is installed in a production system.

4. The method according to claim 1, wherein the elastic sensing element comprises a stress-sensitive resistance element.

5. The method according to claim 1, wherein the elastic sensing element comprises a strain gauge.

6. The method according to claim 1, wherein the maintenance operation comprises replacing the diaphragm in the control valve.

7. The method according to claim 1, wherein the maintenance operation comprises refurbishing the control valve.

8. The pneumatic control valve according to claim 1, wherein the baseline sensor record is generated within a pre-determined time period of initial installation of the control valve in a production system.

9. The pneumatic control valve according to claim 1, wherein the baseline sensor record is generated within a pre-determined time period of replacing the diaphragm in the control valve that is installed in a production system.

10. The pneumatic control valve according to claim 1, wherein the elastic sensing element comprises a stress-sensitive resistance element.

11. The pneumatic control valve according to claim 1, wherein the elastic sensing element comprises a strain gauge.

12. The pneumatic control valve according to claim 1, wherein the maintenance operation comprises replacing the diaphragm in the control valve.

13. The pneumatic control valve according to claim 1, wherein the maintenance operation comprises refurbishing the control valve.

14. The system according to claim 1, wherein the maintenance operation comprises refurbishing the control valve.

15. A system for early detection of control valve diaphragm failure, comprising:
    a pneumatic control valve comprising:
        a valve head,
        a valve seat,
        a valve stem,
        an outer housing encompassing the valve head, the valve stem, and the valve seat,
        a diaphragm for controlling a fluid passage of the pneumatic control valve; and
        an elastic sensing element disposed partially on the diaphragm and partially on the diaphragm plate for early failure detection; and
    a data gathering and analysis system configured such that the data gathering and analysis system:
        generates, using the elastic sensing element, a baseline sensor record comprising initial elasticity measurements of the diaphragm;
        generates, using the elastic sensing element and during a useful life of the control valve, a sequence of periodic sensor records comprising periodic elasticity measurements of the diaphragm;

generates, in response to any periodic sensor record differs from the baseline sensor record by a pre-determined threshold, an alarm; and facilitates, in response to the alarm, a maintenance operation of the control valve.

16. The system according to claim 15, wherein the baseline sensor record is generated within a pre-determined time period of initial installation of the control valve in a production system.

17. The system according to claim 15, wherein the baseline sensor record is generated within a pre-determined time period of replacing the diaphragm in the control valve that is installed in a production system.

18. The system according to claim 15, wherein the elastic sensing element comprises a stress-sensitive resistance element or a strain gauge.

19. The system according to claim 15, wherein the maintenance operation comprises replacing the diaphragm in the control valve.

20. A pneumatic control valve comprising:
- a diaphragm for controlling a fluid passage of the pneumatic control valve, the control valve comprising:
  - a valve head,
  - a valve seat,
  - a valve stem, and
  - an outer housing encompassing the valve head, the valve stem, and the valve seat,
  - wherein the valve stem is coupled to a diaphragm plate and the diaphragm; and
- an elastic sensing element disposed partially on the diaphragm and partially on the diaphragm plate for early failure detection,
- wherein a baseline sensor record is generated using the elastic sensing element and comprises initial elasticity measurements of the diaphragm,
- wherein a sequence of periodic sensor records during a useful life of the control valve is generated using the elastic sensing element and comprises periodic elasticity measurements of the diaphragm,
- wherein an alarm is generated in response to any periodic sensor record differs from the baseline sensor record by a pre-determined threshold, and
- wherein a maintenance operation of the control valve is performed in response to the alarm.

* * * * *